(12) United States Patent
Ikeda et al.

(10) Patent No.: US 8,096,122 B2
(45) Date of Patent: Jan. 17, 2012

(54) ELECTRICALLY DRIVEN BRAKE BOOSTER AND MASTER CYLINDER

(75) Inventors: Junichi Ikeda, Tokyo (JP); Hirotaka Oikawa, Yokohama (JP); Takayuki Ohno, Minami-Alps (JP)

(73) Assignee: Hitachi, Ltd., Tokyo (JP)

( * ) Notice: Subject to any disclaimer, the term of this patent is extended or adjusted under 35 U.S.C. 154(b) by 659 days.

(21) Appl. No.: 12/318,102

(22) Filed: Dec. 22, 2008

(65) Prior Publication Data

US 2009/0178404 A1 Jul. 16, 2009

(30) Foreign Application Priority Data

Dec. 27, 2007 (JP) ................................ 2007-337979

(51) Int. Cl.
*B60T 13/74* (2006.01)

(52) U.S. Cl. ........................................................ 60/545
(58) Field of Classification Search .................... 60/538, 60/545

See application file for complete search history.

(56) References Cited

U.S. PATENT DOCUMENTS 7,367,187 B2 * 5/2008 Ikeda et al. ..................... 60/545

FOREIGN PATENT DOCUMENTS

JP 2007-191133 8/2007
WO WO 2007034961 A1 * 3/2007

* cited by examiner

*Primary Examiner* — Thomas E Lazo
(74) *Attorney, Agent, or Firm* — Wenderoth, Lind & Ponack, Ltd.

(57) ABSTRACT

An electric booster according to the present invention comprises a booster piston disposed around an input piston so as to movable relative to the input piston. The booster piston and input piston also serve as a primacy piston of a tandem master cylinder. A brake fluid pressure is generated in the tandem master cylinder by an input thrust force provided from a brake pedal to the input piston and a booster thrust force provided from the electronic actuator to the booster piston. In this electric booster, a slide hole is formed through the secondary piston of the tamed master cylinder in the axial direction therefore, and a rod member is slidably disposed through the slide hole. When the fluid pressure is not increased in the primary pressure chamber, due to the fluid pressure in the secondary pressure chamber, the rod member comes to abut against the input piston, and a reactive force in the secondary pressure chamber is returned to the brake pedal.

20 Claims, 5 Drawing Sheets

ELECTRICALLY DRIVEN BRAKE BOOSTER AND MASTER CYLINDER

BACKGROUND OF THE INVENTION

The present invention relates to a booster and a master cylinder for use in a brake system of a vehicle.

Examples of conventional electric boosters include the electric booster disclosed in Japanese Patent Public Disclosure No. 2007-191133. This electric booster comprises an axial member adapted to move forward and backward in response to an operation of a brake pedal, a cylindrical member disposed around the axial member so as to be movable relative to the axial member, and an electric actuator operable to cause a forward/backward movement of the cylindrical member. In this electric booster, the axial member and the cylindrical member face a primary pressure chamber of a tandem master cylinder, and a brake fluid pressure is generated in the tandem master cylinder by an input thrust force provided from the brake pedal to the axial member, and a booster thrust force provided from the electric actuator to the cylindrical member.

However, in the electric booster disclosed in Japanese Patent Public Disclosure No. 2007-191133, when the axial member moves forward under circumstances in which the fluid pressure in the primary pressure chamber of the tandem master cylinder is difficult to be increased for some reason, for example, bubble presence in the fluid, the fluid pressure in the primary pressure chamber remains low while the fluid pressure in the secondary pressure chamber is increased by a forward movement of the cylindrical member. As a result, a fluid pressure reactive force cannot be transmitted to the axial member (brake pedal). In this case, a driver continues the pedal operation, with a still weak pedal pressing force, i.e., without feeling a reactive force of the brake fluid pressure, whereby it becomes difficult to control the fluid pressure in the secondary pressure chamber.

SUMMARY OF THE INVENTION

The present invention has been contrived in consideration of the above-mentioned conventional problem, and an object thereof is to provide an electric booster and a master cylinder in which, even under circumstances in which the fluid pressure in the primary pressure chamber of the tandem master cylinder is difficult to be increased, the fluid pressure in the secondary pressure chamber can be easily controlled.

To achieve the foregoing and other objects, the present invention is configured so that a tip of an axial member can abut against a base end side of a secondary piston when a fluid pressure is not generated in a primary pressure chamber by a movement of the axial member.

DETAILED DESCRIPTION OF THE INVENTION

Hereinafter, preferred embodiments of the present invention will be described with reference to the accompanying drawings.

Figure 1:
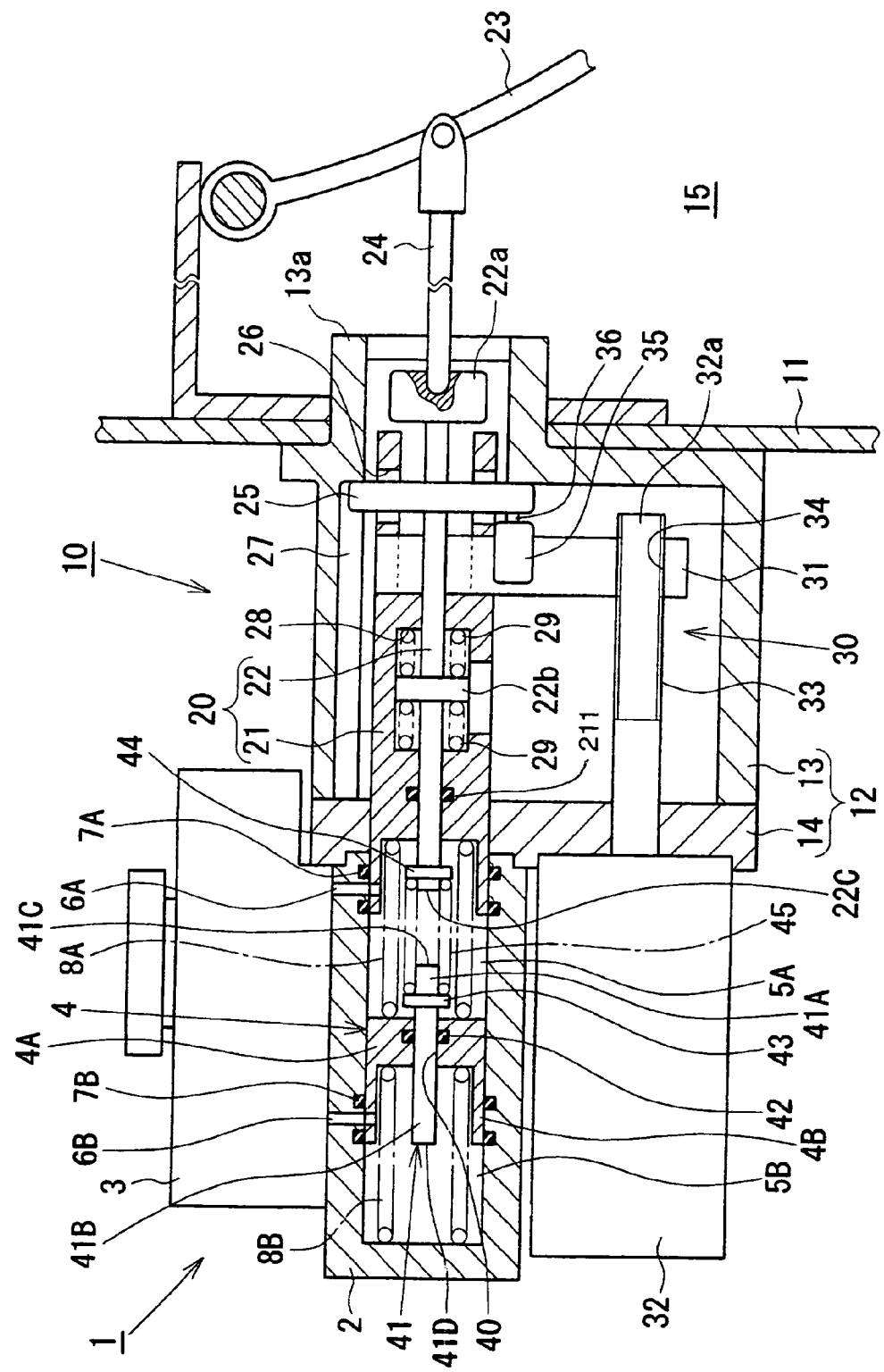
FIG. 1 is a cross-sectional view illustrating an overall structure of an electric booster according to a first embodiment of the present invention.

FIG. 1 shows a first embodiment of an electric booster according to the present invention. An electric booster 10 comprises a booster case 12 having one end fixed to a vehicle compartment wall 11 separating an engine room and a vehicle compartment, and the other end coupled to a tandem master cylinder 1 which will be described later. The booster case 12 comprises a bottomed case body 13 and a cover 14 covering an opening of the case body 13. While the case body 13 is fixed to the vehicle compartment front wall 11, the tandem master cylinder 1 is coupled to the cover 14 of the case body 13. Further, a cylindrical boss portion 13a is formed on a bottom plate portion of the case body 13, and the boss portion 13a extends into a vehicle compartment 15 through the vehicle compartment wall 11. The booster case 12 contains a piston assembly 20 and an electric actuator 30. The piston assembly 20 also serves as a primary piston of the tandem master cylinder 1, as will be described later. The electric actuator 30 is operable to actuate a booster piston 21 which is one of components of the piston assembly 20. Hereinafter, for convenience of description, the side of the vehicle compartment 15 is referred to as "rear side (rear end side)", and the side of the tandem master cylinder 1 is referred to as "front side (front end side)".

The tandem master cylinder 1 comprises a bottomed cylinder body 2. A secondary piston 4, which makes a pair of the piston assembly 20 serving as the primary piston, is slidably disposed on the bottom side of the cylinder body 2. Two pressure chambers 5A and 5B are defined in the cylinder body 2 by the piston assembly 20 and the secondary piston 4. As the piston assembly 20 and the secondary piston 4 move forward, brake fluid sealingly contained in the pressure chambers 5A and 5B is pushed and sent to a wheel cylinder of the associated system via a not-shown brake fluid pressure control unit. A reservoir 3 is attached to the cylinder body 2. The reservoir 3 contains brake fluid, and can supply the brake fluid to the pressure chambers 5A and 5B.

Further, relief ports 6A and 6B are formed at the cylinder body 2 for connecting the reservoir 3 to the insides of the pressure chambers 5A and 5B. A pair of seal members 7A and 7B are disposed on the inner surface of the cylinder body 2 so that the relief ports 6A and 6B are respectively sandwiched by the seal members 7A and 7B. Return springs 8A and 8B are respectively disposed in the pressure chambers 5A and 5B for urging backward the piston assembly 20 and the secondary piston 4. The pressure chambers 5A and 5B are closed to the relief ports 6A and 6B when the pair of seal members 7A and 7B respectively slidingly contact the outer circumferential surfaces of the piston assembly 20 and the secondary piston 4 due to forward movements of the piston assembly 20 and the secondary piston 4. The secondary piston 4 comprises a disk portion 4A on the base side thereof and a cylindrical portion 4B on the tip side thereof. The disk portion 4A and the cylindrical portion 4B are coupled to form the secondary piston 4.

The piston assembly 20 of the electric booster 1 comprises the booster piston 21, and an input piston 22 inserted through the booster piston 21 so as to be movable relative to the booster piston 21. The input piston 22 can move forward and backward in response to an operation of a brake pedal 23 due to coupling an enlarged end portion 22a disposed on the rear end side of the input piston 22 to an input rod 24 extending from the brake pedal 23. The input rod 24 is coupled to the enlarged end portion 22a so as to be swingable by a predetermined angle for allowing a swinging movement of the input rod 24. In the first embodiment, the input piston 22 corresponds to an axial member movable forward and backward in response to an operation of the brake pedal 23, and the booster piston 21 corresponds to a cylindrical member disposed around the axial member so as to be relatively movable to the axial member.

The booster piston 21 included in the piston assembly 20 has a front end portion inserted in the primary pressure chamber 5A in the tandem master cylinder 1. The input piston 22 slidably extends through the booster piston 21, and has a front end portion also inserted in the primary pressure chamber 5A. A seal member 211 provides a seal between the input piston 22 and the booster piston 21. The seal member 7A provides a seal between the tandem master cylinder 1 and the booster piston 21. Due to provisions of the seal members 7A and 211, brake fluid is prevented from leaking from the primary pressure chamber 5A to the outside of the tandem master cylinder 1.

Referring to the rear end side of the input piston 22, a pin 25 is fixedly press-fitted so as to be disposed perpendicularly to the input piston 22. The pin 25 is inserted and extends through an axial elongated hole 26 formed through the booster piston 21. One end of the pin 25 is inserted in an axial slit 27 formed on the inner surface of the booster case 12. The other end of the pin 25 extends to a position for enabling the pin 25 to contact a step of the booster case 12. That is, the pin 25 serves to prevent a relative rotation between the input piston 22 and the booster piston 21, and limit a backward movement of the input piston 22. A range of a relative displacement between the booster piston 21 and the input piston 22 is determined by a range of a displacement of the pin 25 in the elongated hole 26. Therefore, the pin 25 also serves as a stopper for defining the range of a relative displacement between the input piston 22 and the booster piston 21.

An annular space 28 is defined between the input piston 22 and the booster piston 21. A pair of balance springs (urging unit) 29 are disposed in the annular space 28. The balance springs 29 each have one end engaged to a spring retainer 22b disposed at the input piston 22 and the other end engaged to the booster piston 21. The pair of balance springs 29 are disposed with preloads set thereto, and serve to maintain the input piston 22 and the booster piston 21 at their neutral positions of a relative displacement when the brake is not in operation. When the pistons 21 and 22 are at their neutral positions, the pin 25 fixed to the input piston 22 is positioned at a middle position of the elongated hole 26 of the booster piston 21.

An operation lever 31, which is one of components of the electronic actuator 30, is press-fitted in the rear end portion of the booster piston 21 from the radially outside thereof. An electric motor 32, which is also one of components of the electronic actuator 30, is disposed under the tandem master cylinder 1, and is attached to the front cover 14 of the booster case 12 so as to be horizontally disposed. A long output shaft 32a of the electric motor 32 extends in the booster case 12, and has a tip portion on which a screw portion 33 is formed. The operation lever 31 has one end fixedly coupled to the booster piston 21, and the other end provided with a screw hole 34, in which the screw portion 33 is screwed. Due to this configuration, a rotation of the electric motor 32 is converted into a linear movement by a mesh of the screw portion 33 with the screw hole 34, and is transmitted to the operation lever 31. That is, the operation lever 31 performs a parallel displacement, i.e., linear displacement in the axial direction of the cylinder body 2 according to a rotation of the electric motor 32, causing the booster piston 21 to move along therewith. Therefore, a booster thrust force is provided to the booster piston 21 according to an output of the electric motor 32.

A potentiometer 35, which is an exemplary embodiment of a displacement detector, is disposed at an intermediate position of the operation lever 31. The potentiometer 35 is disposed so that the tip of a detection rod 36 of the potentiometer 35 abuts against the pin 25 fixed to the input piston 22. The potentiometer 35 is operable to detect an amount of a relative displacement between the input piston 22 and the booster piston 21. A detection signal of the potentiometer 35 is transmitted to a controller (not shown) configured to control the electric motor 32.

In the first embodiment, further, a slide hole 40 is formed at a position of the central axis of the disk portion 4A located on the base side of the secondary piston 4 of the tandem master cylinder 1. A rod member 41, which is an exemplary embodiment of a transmission member, is slidably inserted through the slide hole 40. One end side 41A of the rod member 41 extends into the primary pressure chamber 5A from the disk portion 4A located on the base side of the secondary piston 4, and is capable of abutting against the tip of the input piston 22 although some space is maintained therebetween under normal conditions. The other end side 41B of the rod member 41 extends from the disk portion 4A in the cylindrical portion 4B, and is disposed so as to face the secondary pressure chamber 5B. A seal member 42 fitted in the slide hole 40 provides a seal between the rod member 41 and the secondary piston 4. A stopper 43 capable of abutting against the secondary piston 4 is disposed on the rear end side of the rod member 41 extending in the primary pressure chamber 5A, while a spring retainer 44 is disposed at the front end portion of the input piston 22. A weak spring 45 is disposed between the spring retainer 44 and the stopper 43 disposed at the rod member 41 for urging the rod member 41 away from the input piston 22.

The electric booster 10 configured as discussed above functions in the following manner.

In the electric booster 10 configured as discussed above, when the brake pedal 23 is pushed down, i.e., the input piston 22 moves forward, the electric motor 32 rotates accordingly. The rotation of the electric motor 32 is converted into a linear movement of the operation lever 31, which causes a forward movement of the booster piston 21. In this way, a brake fluid pressure is generated in the pressure chambers 5A and 5B in the tandem master cylinder 1, according to an input thrust force provided to the input piston 22 by the brake pedal 23 and a booster thrust force provided to the booster piston 21 by the electric motor 32.

When the brake is actuated in this way, if the rotation (rotation angle) of the electric motor 32 is controlled so that a relative displacement is not generated between the input piston 22 and the booster piston 21, the pair of balance spring members 29 disposed between the pistons 22 and 21 maintain their neutral positions. Since the relative displacement amount is zero, the boost ratio at this time is determined as a fixed value based on the area ratio of the pressure-receiving areas of the booster piston 21 and the input piston 22. On the other hand, if the booster piston 21 is relatively displaced from the neutral position in a direction (front side) causing the brake fluid pressure to be increased by the booster thrust force, the boost ratio (braking force) is increased, whereby a brake assist operation by the electric motor 32 is realized. If the booster piston 21 is relatively displaced from the neutral position in a direction (rear side) causing the brake fluid pressure to be decreased by the booster thrust force, the boost ratio (braking force) is reduced, whereby a regenerative operation in regenerative braking is realized. It should be noted that, when the brake is in operation, the rod member 41 is prevented from accidentally colliding with the input piston 22 since the rod member 41 is urged away from the input piston 22 by the spring 45.

If a fluid pressure Pp generated in the primary pressure chamber 5A of the tandem master cylinder 1 is equal to or higher than a fluid pressure Ps generated in the secondary pressure chamber 5B while the brake is in operation by depression of the brake pedal 23 as described above, given that a reactive force of the weak spring 45 is ignored, a thrust force Fi acting on the input piston 22 is expressed by the following equation (1), in which $\Delta X$ represents the amount of the relative displacement between the input piston 22 and the booster piston 21, K represents the spring constant of the balance spring 29, and Ap represents the pressure-receiving area of the tip surface 22c of the input piston 22. The thrust force Fi on the input piston 22, i.e., the operation force on the brake pedal 23 (pedal operation force) is determined based on the fluid pressure (reactive force of fluid pressure) of the primary pressure chamber 5A. In this case, the rod member 41 moves forward by receiving the fluid pressure of the primary pressure chamber 5A on the one end side 41A, and the rod member 41 is positionally-fixed to a forward end position causing the stopper 43 to abut against the secondary piston 4.

$$Fi = K \times \Delta X + Ap \times Pp \quad (1)$$

On the other hand, if the fluid pressure Ps generated in the secondary pressure chamber 5B is higher than the fluid pressure Pp generated in the primary pressure chamber 5A, the rod member 41 on the base side of the secondary piston 4 moves backward, and thereby the one end side 41A of the rod member 41 comes to abut against the input piston 22. Therefore, the thrust force Fi acting on the input piston 22 is expressed by the following equation (2), in which As represents the pressure-receiving area of the end surface 41C of the one end side 41A of the rod member 41.

$$Fi = K \times \Delta X + Ap \times Pp + As \times (Ps - Pp) \quad (2)$$

Therefore, for example, even if the input piston 22 moves forward under circumstances in which the fluid pressure in the primary pressure chamber 5A of the tandem master cylinder 1 is difficult to be increased due to, for example, bubble presence in the fluid, a fluid pressure increase in the secondary pressure chamber 5B generates a reactive force by the fluid pressure in the secondary pressure chamber 5B, i.e., As × (Ps−Pp), which is then transmitted to the brake pedal via the rod member 41 and the input piston 22. Therefore, because a driver can feel a reactive force according to the fluid pressure increase in the secondary pressure chamber 5B, the driver can easily control the fluid pressure in the secondary pressure chamber 5B.

Therefore, it is possible to prevent that the driver would otherwise continue a pedal operation without feeling a reactive force of a brake fluid pressure, and thereby the fluid pressure would be increased to a pressure corresponding to the booster thrust force maximum value, as a result of which the driver would feel a significant sense of discomfort.

If the pressure-receiving area As of the end surface 41C of the one end side 41A of the rod member 41 is equal to the pressure-receiving area Ap of the tip surface 22c of the input piston 22 (As =Ap), when no fluid pressure is generated in the primary pressure chamber 5A, the thrust force Fi acting on the input piston 22 is expressed by the following equation (3), and only the fluid pressure Ps in the secondary pressure chamber 5B is returned to the brake pedal 23 as a reactive force. In this case, the driver feels a reactive force approximately equal to the one which would be returned when a fluid pressure is normally generated in the primary pressure chamber 5A.

$$Fi = K \times \Delta X + As \times Ps \quad (3)$$

In other words, when the fluid pressure is different between the primary pressure chamber 5A and the secondary pressure chamber 5B of the tandem master cylinder 1, the higher fluid pressure is returned to the brake pedal 23 as a reactive force. Therefore, even under circumstances in which the fluid pressure in one of the two pressure chambers is difficult to be increased for some reason, a reactive force corresponding to the fluid pressure in the other pressure chamber is returned to the brake pedal, whereby the fluid pressure in the other pressure chamber can be easily controlled, and a driver's sense of discomfort can be reduced.

Figure 2:
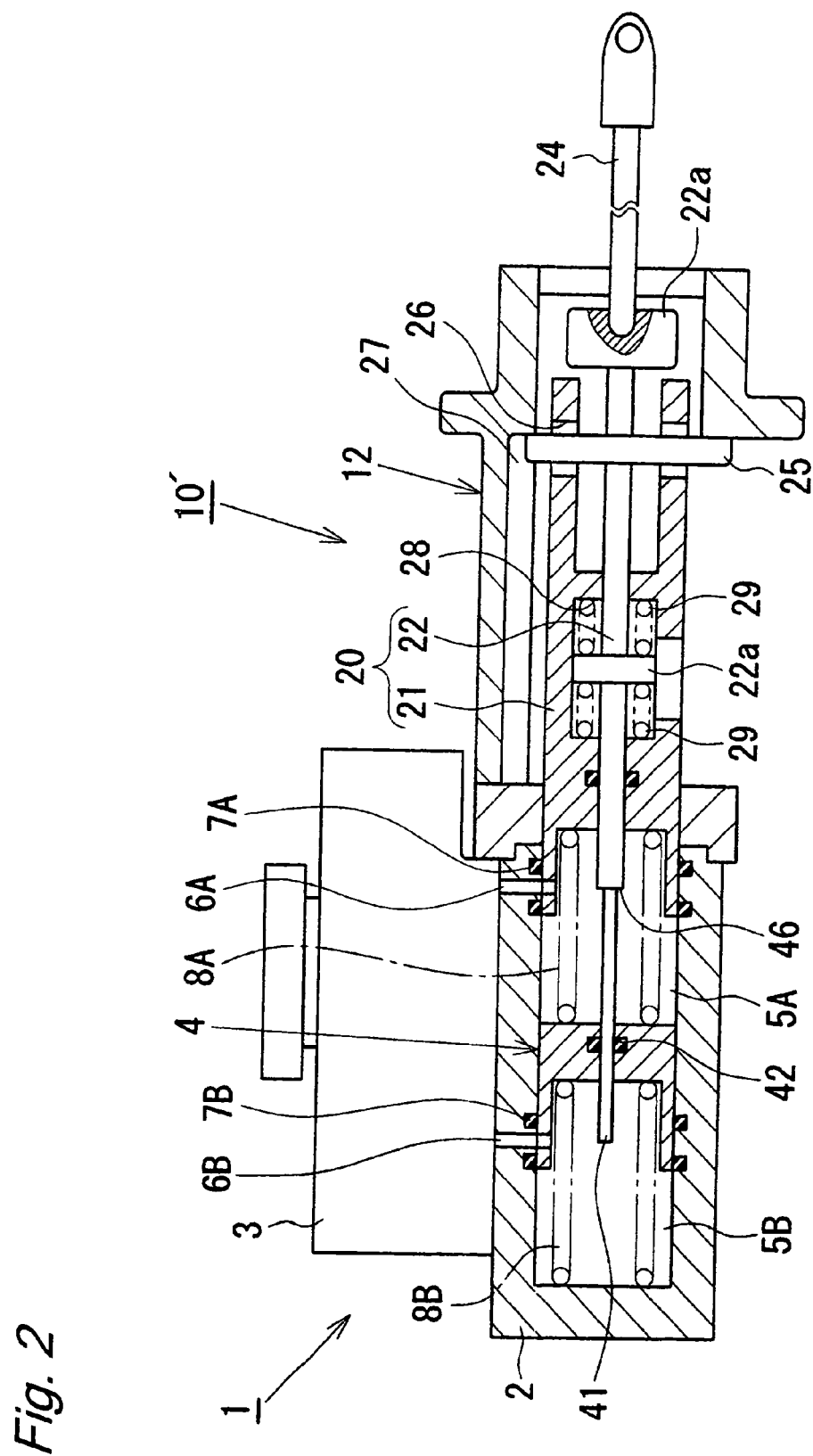
FIG. 2 is a cross-sectional view illustrating main components of an electric booster according to a second embodiment of the present invention.

FIG. 2 shows a second embodiment of the present invention. The second embodiment is characterized in that the rod member 41 is integrally formed with the input piston 22, unlike the above-described first embodiment. In the second embodiment, the rod member 41, which is an exemplary embodiment of a transmission member, is formed so as to have a smaller diameter than that of the input piston 22, and an annular stepped surface 46 is formed at the boundary of the rod member 41 and the input piston 22. Therefore, in the second embodiment, the annular stepped surface 46 corresponds to the pressure-receiving surface of the input piston 22. Since an electric booster 10', which will be described as the second embodiment, has a basically similar structure to that of the first embodiment, like components are identified by like reference numerals, and the detailed description thereof will not be repeated for the sake of brevity.

In the second embodiment, the thrust force Fi on the input piston 22 when the brake is in operation is expressed by the following equation (4), in which, as in the first embodiment, Pp represents the fluid pressure generated in the primary pressure chamber 5A, Ps represents the fluid pressure generated in the secondary pressure chamber 5B, Ap represents the pressure-receiving area of the input piston 22 (area of the annular stepped surface 46), As represents the pressure-receiving area of the rod member 41, $\Delta X$ represents the amount of the relative displacement between the input piston 22 and the booster piston 21, and K represents the spring constant of the balance spring 29.

$$Fi = K \times \Delta X + Ap \times Pp + As \times Ps \quad (4)$$

If the pressure-receiving area As of the rod member 41 is equal to the pressure-receiving area Ap of the input piston 22 (As =Ap), then the thrust force Fi acting on the input piston 22 is expressed by the following equation (5).

$$Fi = K \times \Delta X + Ap(Pp + Ps) \quad (5)$$

Therefore, the sum of the fluid pressure Pp in the primary pressure chamber 5A and the fluid pressure Ps of the secondary pressure chamber 5B is returned to the brake pedal 23 as a reactive force. In this case, if twice the pressure-receiving area Ap of the input piston 22 (2×Ap) is equal to the pressure-receiving area of the input piston 22 in the first embodiment, the average of the fluid pressures Pp and Ps is returned to the brake pedal 23 as a reactive force. Therefore, when the fluid pressure Pp in the primary pressure chamber 5A is not increased, half the fluid pressure in the secondary pressure chamber 5B is returned to the brake pedal 23 as a fluid pressure reactive force. In this case, a reactive force approximately proportional to the vehicle deceleration is returned to the brake pedal, whereby a driver's sense of discomfort can be reduced.

Figure 3:
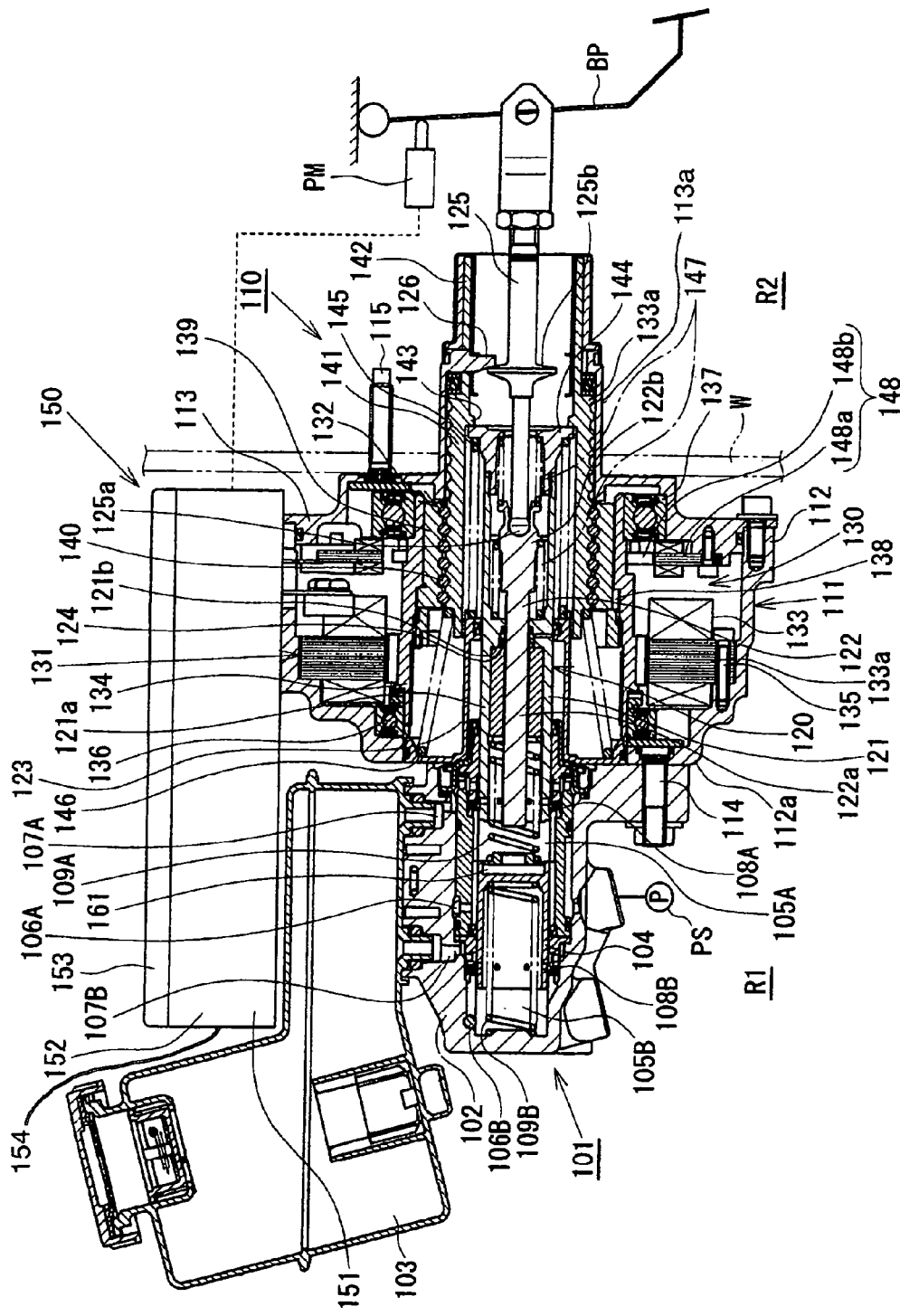
FIG. 3 is a cross-sectional view illustrating an overall structure of an electric booster according to a third embodiment of the present invention.
Figure 4:
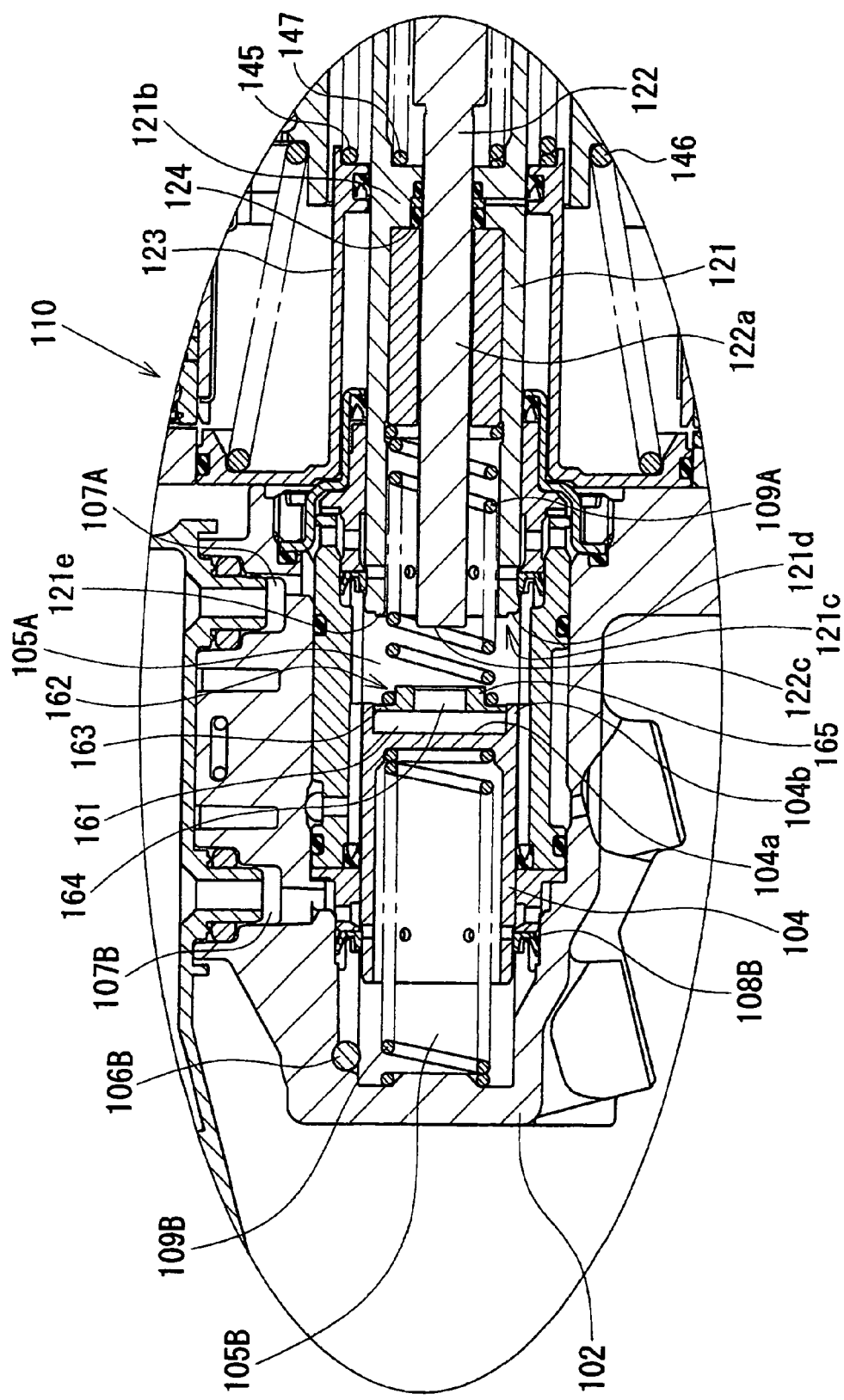
FIG. 4 is a cross-sectional view illustrating main components of the electric booster according to the third embodiment of the present invention.

FIGS. 3 and 4 show a third embodiment of the present invention. The third embodiment is characterized in that it employs, instead of the rod member 41 employed as an example of a transmission member in the first and second embodiments, an elastic member as another example of a transmission member. In the third embodiment, an electric booster 110 comprises a casing 111 having one end fixed to a partition wall W separating an engine room R1 and a vehicle compartment R2, and the other end coupled to a tandem master cylinder 101, which will be described later. Hereinafter, for convenience of description, the side of the engine room R1 is referred to as "front side", and the side of the vehicle compartment R2 is referred to as "rear side". The casing 111 comprises a cylindrical casing body 112, and a cover 113 attached to the rear side end of the casing body 112 by a bolt. A stepped wall 112a is integrally formed at the front end of the casing body 112, and the tandem master cylinder 101 is fixedly coupled to the wall 112a by a stud bolt 114. The cover 113 is fixedly coupled to the partition wall W by a stud bolt 115. While the components are coupled with one another in this way, a cylindrical boss portion 113a integrally formed with the cover 113 extends in the vehicle compartment R2 through the partition wall W.

The casing 111 constituting the electric booster 110 contains a piston assembly 120 and an electric actuator 130. The piston assembly 120 also serves as a primary piston of the tandem master cylinder 101, as will be described later. The electric actuator 130, which will be described later, is operable to actuate a booster piston 121 which is one of components of the piston assembly 120. On the other hand, an ECU (Electric Control Unit) 150, which will be described later, is integrally formed on the top of the casing 111 for controlling actuation of the electric actuator 30.

As also shown in FIG. 4, the tandem master cylinder 101 comprises a bottomed cylindrical cylinder body 102. A secondary piston 104, which makes a pair of the piston assembly 120 serving as the primary piston, is slidably disposed in the cylinder body 102 at the bottom side of the cylinder body 102. Two pressure chambers 105A and 105B are defined in the cylinder body 102 by the piston assembly 120 and the secondary piston 104. As the piston assembly 120 and the secondary piston 104 move forward, brake fluid sealingly contained in the pressure chambers 105A and 105B is pushed and sent through discharge ports 106A and 106B formed at the cylinder body 102 to a wheel cylinder of the associated system via a not-shown brake fluid pressure control unit. A reservoir 103 is attached to the cylinder body 102. The reservoir 3 contains brake fluid, and can supply the brake fluid to the pressure chambers 105A and 105B.

Further, relief ports 107A and 107B are formed at the cylinder body 102 for connecting the reservoir 103 to the insides of the pressure chambers 105A and 105B. A pair of seal members 108A and 108B are disposed on the inner circumferential surface of the cylinder body 102 so as to disconnect the relief ports 107A and 107B and the pressure chambers 105A and 105B as the pistons 120 and 104 move forward. Return springs 109A and 109B are respectively disposed in the pressure chambers 105A and 105B for constantly urging backward the piston assembly 120 serving as the primary piston and the secondary piston 104. When the pistons 120 and 104 are at their backward end positions, the pressure chambers 105A and 105B are in communication with the reservoir 103 via the relief ports 107A and 107B,
whereby the brake fluid is supplied from the reservoir 103 to the pressure chambers 105A and 105B.

The piston assembly 120 comprises the above-mentioned booster piston 121 and an input piston 122. The rod-like input piston 122 is inserted through the cylindrical booster piston 121, and is disposed so as to be relatively movable to the booster piston 121. An input rod 125 is coupled to an enlarged end portion 122b so as to be swingable by a predetermined angle for allowing a swinging movement of the input rod 125. In the third embodiment, the input piston 122 corresponds to an axial member movable forward and backward from a position where the brake is not in operation in response to an operation of a brake pedal BP, and the booster piston 121 corresponds to a cylindrical member disposed around the axial member so as to be relatively movable to the axial member.

As also shown in FIG. 4, the booster piston 121 is slidably inserted in a guide 123 fitted into the front end wall 112a of the casing body 112. The booster piston 121 has a front side portion 121a extending in the primary pressure chamber 105A of the tandem master cylinder 110. On the other hand, the input piston 122 is slidably inserted through an annular wall portion 121b formed on the inner circumferential surface of the booster piston 121 at an axially central portion of the booster piston 121. The input piston 122 has a front end side 122a extending in the primary pressure chamber 105A of the tandem master cylinder 101, similar to the front side portion 121a of the booster piston 121. The seal member 108A provides a seal between the booster piston 121 and the cylinder body 102 of the tandem master cylinder 101. A seal member 124 disposed at the wall portion 121b provides a seal between the booster piston 121 and the input piston 122. Due to provisions of the seal members 108A and 124, brake fluid is prevented from leaking from the primary pressure chamber 105A to the outside of the tandem master cylinder 101.

Referring to the rear side end 122b of the input piston 122, a tip portion 125a of the input rod 125 adapted to move together with the brake pedal BP is coupled to the rear side end 122b so as to be swingable relative to the rear side end 122b by a predetermined angle. The input piston 22 is adapted to move forward and backward in the booster piston 121 in response to an operation of the brake pedal BP (pedal operation). An enlarged diameter portion 125b is integrally formed at an intermediate position of the input rod 125. Due to the provision of the enlarged diameter portion 125b, a backward movement (movement toward the vehicle compartment R2 side) of the input rod 125 is limited by abutment of the enlarged diameter portion 125b against an inner protrusion 126 integrally formed at the rear end of the boss portion 113a of the cover 113. That is, the backward end of the input piston 122 is the position of the input piston 122 where the enlarged diameter portion 125b of the input rod 125 abuts against the inner protrusion 126 of the cover 113.

The electric actuator 130 comprises an electric motor 131 and a ball screw mechanism 132 operable to convert a rotation of the electric motor 131 into a linear movement and transmit it to the booster piston 121. The electric motor 131 comprises a stator 133 including a plurality of coils 133a, and a hollow rotor 134 adapted to rotate by application of an electric current to the stator 133. The stator 133 is fixed to the casing body 112 by a bolt 135. The rotor 134 is rotatably supported relative to the casing body 112 and the rear cover 113 via a bearing 136 fixed to the casing body 112 and a bearing 137 fixed to the rear cover 113. Therefore, in the third embodiment, the casing 111 is configured to also serve as a motor casing. In the third embodiment, a rotation-linear movement converting mechanism is embodied by the ball screw mechanism 132, but may be embodied by another mechanism such as a screw mechanism or a roller screw mechanism.

The ball screw mechanism 132 comprises a nut member 139 non-rotatably fittedly fixed to the rotor 134 of the electric motor 131 by a key 138 and linearly movable in the axial direction of the member 139, and a hollow screw shaft 141 rotatably meshed with the nut member 139 via a plurality of balls 40. An axially extending slit 142 is formed on the rear side of the screw shaft 141. The inner protrusion 126 of the cover 113 is inserted in the slit 142, whereby the screw shaft 141 is arranged so that it cannot rotate relative to the inside of the casing 111. Since the screw shaft 141 is non-rotatable in this way, when the nut member 139 rotates integrally with the rotor 134, this rotation causes a linear movement of the screw shaft 141.

On the other hand, a protrusion 143 is formed on the inner circumferential surface of the screw shaft 141, and is configured to abut against a flange member 144 screwed into the rear side end portion of the booster piston 121. A return spring 145 is disposed between the flange member 144 and the cylindrical guide 123 fitted to the casing body 112. The flange member 144 of the booster piston 121 normally abuts against the annular protrusion 143 of the screw shaft 141 with the aid of the return spring 145. Therefore, as the screw shaft 141 moves forward in response to a rotation of the nut member 139, the booster piston 121 also moves forward by being pushed by the screw shaft 141. In the third embodiment, the position of the screw shaft 141 while the brake is not in operation is determined by abutment of the start end of the slit 142 against the inner protrusion 126 of the cover 113. The position of the screw shaft 141 during this abutment is the backward end of the screw shaft 141. Accordingly, the position of the booster piston 121 while the brake is not in operation is also determined by abutment of the flange member 44 against the protrusion 143 of the screw shaft 141 positioned at the backward end thereof. The position of the booster piston 121 during this abutment is the backward end of the booster piston 121. A holding spring 146 is disposed between the screw shaft 141 and the guide 123 for urging backward the screw shaft 141 and preventing an unnecessary forward movement of the screw shaft 141 due to, for example, a vehicle oscillation or vibration.

As best shown in FIG. 4, a pair of balance springs 147 are disposed between the booster piston 121 and the input piston 122 of the piston assembly 120. The pair of balance springs 147 serve to maintain the booster piston 121 and the input piston 122 at their neutral positions of a relative displacement while the brake is not in operation, and also serve to adjust a reactive force to be transmitted from the input piston 122 to the brake pedal BP when a relative displacement is generated between the booster piston 121 and the input piston 122.

In the third embodiment, a potentiometer PM is disposed at a fixed portion in the vehicle compartment R2 for detecting an absolute displacement i.e., an input stroke of the input piston 122 relative to the vehicle body based on a movement of the input rod 25. The potentiometer PM may detect an absolute displacement, i.e., an input stroke of the brake pedal BP relative to the vehicle body. Further, a resolver 148 is disposed in the casing 111 for serving as a rotational angle sensor for detecting an absolute displacement of the booster piston 121 relative to the vehicle body based on a rotational displacement of the electric motor 131. The resolver 148 comprises a resolver stator 148a attached to the casing 111 (casing body 112) by a bolt, and a resolver rotor 148b disposed around an outer circumferential surface of the rotor 134 of the electric motor 131.

The electric motor 131, the resolver 148 and the potentiometer PM are connected to the ECU 150. The ECU 150 actuates the electric motor 131 according to an input stroke of the input piston 122 detected by the potentiometer PM, and controls the booster piston 121 so that the booster piston 121 moves forward integrally with the input-piston 122. The ECU 150 also performs a brake assist control or a regenerative control as necessary by controlling the booster piston 121 so that the booster piston 121 relatively moves to the input piston 122 according to a running condition. The ECU 150 is disposed in an ECU casing 154 comprising a box-shaped casing body 152 having a bottom portion 151 and formed integrally with the casing 111, and a cover 153 covering an opening of the casing body 152 opposite the bottom portion 153. Overall, the ECU casing 154 has a substantially rectangle shape.

The characteristic features of the third embodiment will now be described with reference to FIG. 4. As shown in FIG. 4, a circular groove 104a sharing a common radial center with the secondary piston 104 is formed on the base end side of the secondary piston 104, and a peripheral wall 104b is formed around the groove 104a. In the groove 104a, a rubber reaction disk 161, which corresponds to an elastic member as another example of a transmission member, is disposed so as to abut against the bottom of the groove 104a and the inner circumferential surface of the peripheral wall 104b. Further, a ring-shaped spring retaining member 162 is disposed in the groove 104a so as to abut against the opposite surface of the reaction disk 161 from the surface abutting against bottom of the groove 104a, and so as to be movable on the inner circumferential surface of the peripheral wall 104b. The return spring 109A abuts against the spring retaining member 162. In the third embodiment, the reaction disk 161 corresponds to an elastic member which is disposed on the base end side of the secondary piston and which the tip of an axial member can abut against.

The spring retaining member 162 comprises a thin portion 163 formed on the outer circumferential side of the spring retaining member 162, and a thick portion 165 integrally formed with the thin portion 163. The end surface of the return spring 109A abuts against the thin portion 163 of the spring retaining member 162. The thick portion 165 of the spring retaining portion 162 has a radial dimension approximately equal to the inner diameter of the return spring 109A, and includes at the center thereof a hole 164 having a radial dimension larger than the radial dimension of the tip surface 122c of the input piston 122.

The input piston 122 is disposed so that the tip surface 122c thereof axially extends beyond the tip surface 121c of the booster piston 121 when the brake is not in operation and therefore the input piston 122 and the booster piston 121 are at their respective backward ends. A step is formed on the tip surface 121c of the booster piston 121 in the axial direction of the booster piston 121, whereby the tip surface 121c is provided with an inner-side protrusion portion 121e extending beyond an outer-side surface 121d, and is formed so as to be able to abut against the thin portion 163 of the spring retaining member 162.

The electric booster 110 configured as described above functions in the following manner.

Under circumstances in which the fluid pressure in the primary pressure chamber 105A of the tandem master cylinder 101 can be increased, when the input rod 125, and therefore the input piston 122 move forward in response to a depression of the brake pedal BP, this movement is detected by the potentiometer PM. Then, the ECU 150 outputs an actuation instruction to the electric motor 131 upon receiving a signal from the potentiometer PM, which causes a rotation of the rotor 134 of the electric motor 131. This rotation is converted into a linear movement by the ball screw mechanism 132, and is transmitted to the booster piston 121. In this way, the input piston 122 and the booster piston 121 move forward integrally with each other, and thereby a brake fluid pressure is generated in the pressure chambers 105A and 105B in the tandem master cylinder 101 according to an input thrust force provided from the brake pedal BP to the input piston 122 and a booster thrust force provided from the electric motor 131 to the booster piston 121.

When the brake is actuated in this way, if the rotation of the electric motor 131 is controlled so that a relative displacement is not generated between the input piston 122 and the booster piston 121, the pair of balance springs 147 disposed between the pistons 122 and 121 maintain their neutral positions. Since the relative displacement amount is zero, the boost ratio at this time is determined as a fixed value based on the area ratio of the pressure-receiving areas of the booster piston 121 and the input piston 122, and a reactive force of the fluid pressure in the primary pressure chamber 105A according to the pressure-receiving area of the input piston 122 is transmitted to a driver through the input rod 125 and the brake pedal BP.

On the other hand, when the input piston 122 moves forward under circumstances in which the fluid pressure is difficult to be increased in the primary pressure chamber 105A of the tandem master cylinder 101, the input piston 122 and the booster piston 121 move forward integrally with each other as mentioned above. However, since no fluid pressure is generated in the primary pressure chamber 105A, the tip surface 122c of the input piston 122 passes through the hole 164 of the spring retaining member 162 disposed on the base end side of the secondary piston 104, and starts to abut against the reaction disk 161. This abutment of the tip surface 122c against the reaction disk 161 causes a forward movement of the secondary piston 104, and then generation of a fluid pressure in the secondary pressure chamber 105B.

After that, the inner-side protrusion portion 121e of the booster piston 121 starts to abut against the thin portion 163 of the spring retaining member 162, and aids the input piston 122 by providing an additional force for the forward movement of the secondary piston 104. Since the relative displacement amount is zero, the boost ratio at this time is determined as a fixed value based on the area ratio of the pressure-receiving area of the input piston 122 against the reaction disk 161 and the pressure-receiving area of the spring retaining member 162, and a reactive force of the fluid pressure in the secondary pressure chamber 105B according to the pressure-receiving area of the input piston 122 is transmitted to the driver through the input rod 125 and the brake pedal BP. In this way, the spring retaining member 162 serves as a reactive-force distribution member for distributing a reactive force acting on the reaction disk 161 at a predetermined ratio of the input piston 122 and the booster piston 121 according to the areas of the central hole 164 and the annular portion around the hole 164.

Therefore, even under circumstances in which the fluid pressure in the primary pressure chamber 105A is difficult to be increased for some reason, a reactive force according to the fluid pressure in the secondary pressure chamber 105B is returned to the brake pedal BP, whereby the fluid pressure in the secondary pressure chamber 105B can be easily controlled, and a driver's sense of discomfort can be reduced.

Figure 5:
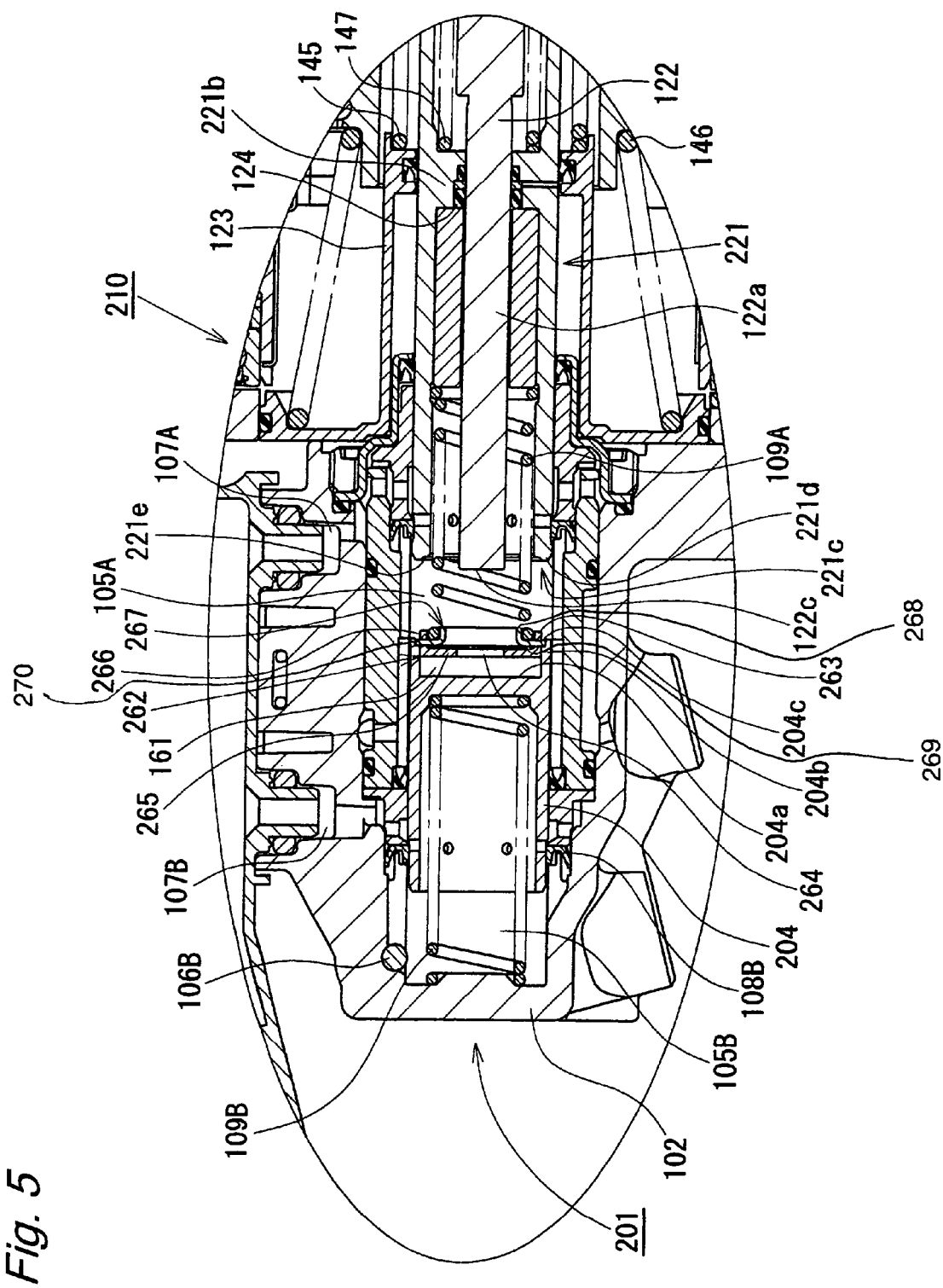
FIG. 5 is a cross-sectional view illustrating main components of an electric booster according to a fourth embodiment of the present invention.

FIG. 5 shows a fourth embodiment of the present invention. The characteristic features of the fourth embodiment are as follows. In the above-discussed third embodiment, the spring retaining member 162 against which the return spring 109A abuts is movable on the inner circumferential surface of the peripheral wall 104b on the base end side of the secondary piston 104. In the fourth embodiment, a spring retaining member is constituted by two components, and therefore a force is not applied to the reaction disk under circumstances in which the fluid pressure in the primary pressure chamber 105A can be increased. In the following description of the fourth embodiment, like components are denoted by like reference numerals as of the third embodiment and will not be further explained in great detail.

The characteristic features of the fourth embodiment will now be described in detail with reference to FIG. 5. As shown in FIG. 5, a circular groove 204a sharing a common radial center with a secondary piston 204 is formed on the base end side of the secondary piston 204, and a peripheral wall 204b is formed around the groove 204a. A step groove portion 204c is formed on the opening side of the peripheral wall 204b so as to have a larger diameter than that of the bottom of the groove 204a. In the groove 204a, a rubber reaction disk 161, which corresponds to an elastic member, is disposed so as to abut against the bottom of the groove 204a and the inner circumferential surface of the peripheral wall 204b. A ring-shaped push piece 262 is disposed in the groove 204a so as to abut against the opposite surface of the reaction disk 161 from the surface abutting against bottom of the groove 204a, and so as to be movable on the inner circumferential surface of the peripheral wall 104b. Further, a ring-shaped spring support member 267 is disposed in the groove 204a so that the return spring 109A abuts against the spring support member 267, and the spring support member 267 abuts against the secondary piston 204 at the step groove portion 204c.

The push piece 262 comprises a peripheral wall 263 erected in the axial direction on the outer circumferential side thereof and abutting against the inner circumferential surface of the peripheral wall 204b, and a plate 265 integrally formed with the peripheral wall 263. The plate 265 includes at the center thereof a hole 264 having a larger radial diameter than that of the tip surface 122c of the input piston 122. A plurality of axial grooves 266 are formed at the peripheral wall 263 in the axial direction thereof.

The spring support member 267 is made of a ring-shaped steel plate or the like, and comprises at the center thereof an elected portion 268 having a diameter substantially equal to the inner circumferential diameter of the return spring 109A. The inner circumferential side of the return spring 109A abuts against the outer circumferential surface of the elected portion 268. A spring support portion 269 against which the end surface of the return spring 109A abuts is formed on the outer circumferential side relative to the elected portion 268. A plurality of protrusion pieces 270 are formed on the outer circumferential side relative to the spring support portion 269. The protrusion piece 270 extends through the axial groove 266 of the push piece 262 and abuts against the step groove portion 204c of the secondary piston 204. In this way, the spring force of the return spring 109A can act on the secondary piston 204 via the spring support member 267, whereby it is possible to prevent that the reaction disk 161 would otherwise receive a push force when a booster piston 221 moves forward under circumstances in which the fluid pressure can be increased in the primary pressure chamber 105A, and therefore the durability of the reaction disk 161 can be improved.

A step is formed at a tip surface 221c of the booster piston 221 in the axial direction of the booster piston 221, and thereby an outer-side protrusion portion 221d is formed so as to extend beyond an inner-side surface 221e to be able to abut the end surface of the peripheral wall 263 of the push piece 262. In the fourth embodiment, as in the third embodiment, the input piston 122 and the booster piston 221 are disposed so that the tip surface 122c of the input piston 122 extends beyond the tip surface 221c of the booster piston 221 in the axial direction thereof when the brake is not in operation and therefore the input piston 122 and the booster piston 221 are at their respective back ends.

The electric actuator 210 configured as discussed above functions in the following manner under circumstances in which the fluid pressure is difficult to be increased in the primary pressure chamber 105A.

When the input piston 122 moves forwards under circumstances in which the fluid pressure is difficult to be increased in the primary pressure chamber 105A of the tandem master cylinder 201, since a fluid pressure is not generated in the primary pressure chamber 105A even though the input piston 122 and the booster piston 221 move integrally with each other, the tip surface 122c of the input piston 122 passes through the hole 264 of the push piece 262 disposed on the base end side of the secondary piston 204, and starts to abut against the reaction disk 161. This abutment causes a forward movement of the secondary piston 204, and therefore generation of the fluid pressure in the secondary pressure chamber 105B. After that, the outer-side protrusion 221d of the booster piston 221 starts to abut against the end surface of the peripheral wall 263 of the push piece 262, and aids the input piston 122 by providing an additional force for the forward movement of the secondary piston 204. Since the relative displacement amount is zero, the boost ratio at this time is determined as a fixed value based on the area ratio of the pressure-receiving area of the input piston 122 against the reaction disk 161 and the pressure-receiving area of the push piece 262, and a reactive force of the fluid pressure in the secondary pressure chamber 105B according to the pressure-receiving area of the input piston 122 is transmitted to a driver through the input rod 125 and the brake pedal BP.

In this way, even under circumstances in which the fluid pressure in the primary pressure chamber 105A is difficult to be increased for some reason, a reactive force corresponding to the fluid pressure in secondary pressure chamber 105B is returned to the brake pedal BP, whereby the fluid pressure in the secondary pressure chamber 105B can be easily controlled. In addition, the spring force of the return spring 109A can act on the secondary piston 204 via the spring support member 267, whereby it is possible to prevent that the reaction disk 161 would otherwise receive a push force when the booster piston 221 moves forward under circumstances in which the fluid pressure can be increased in the primary pressure chamber 105A, and therefore the durability of the reaction disk 161 can be improved.

In the third and fourth embodiments, in view of easiness of installation, the reaction disk 161 is disposed on the based end side of the secondary piston 104. However, in some embodiments, a rubber member corresponding to an elastic member as a transmission member, may be disposed at the tip of the input piston 122, in which the same effect can be brought about. In the third and fourth embodiment, the reaction disk 161 is adapted to transmit a reactive force to not only the tip of the input piston 122, but also the booster piston 121 or 221 via the spring retaining member 162. However, in some embodiments, a reaction force may be transmitted directly from the secondary piston 104 or 204 to the booster piston 121 or 221, instead of via the reaction disk 161.

In the above-proposed embodiments, an electric actuator embodied by the electric motor 32 or 132 is employed as an actuator for causing a forward or backward movement of the booster piston 21, 121 or 221. However, in some embodiments, a hydraulic actuator or a fluid pressure actuator embodied by, for example, a hydraulic cylinder or a gas pressure cylinder may be employed as an actuator for causing a forward or backward movement of the booster piston 21, 121 or 221.

According to the electric booster and master cylinder in the above-discussed embodiments, even under circumstances in which the fluid pressure in the primary pressure chamber of the tandem master cylinder is difficult to be increased, the fluid pressure in the secondary pressure chamber can be easily controlled.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention. Moreover, all features of all embodiments and all claims can be combined with each other, as long as they do not contradict each other.

The present application claims priority under 35 U.S.C. section 119 to Japanese Patent Application No. 2007-337979, filed on Dec. 27, 2007. The entire disclosure of Japanese Patent Application No. 2007-337979 including specification, claims, drawings and summary is incorporated herein by reference in its entirety.

What is claimed is:

1. An electric booster, comprising:
an axial member movable forward and backward in response to an operation of a brake pedal;
a cylindrical member disposed around the axial member so as to be movable relative to the axial member; and
an electric actuator operable to cause a forward/backward movement of the cylindrical member,
wherein the axial member and the cylindrical member face a primary pressure chamber of a tandem master cylinder having a secondary piston which separates the primary pressure chamber and a secondary pressure chamber;
a reactive force of a brake fluid pressure generated in the tandem master cylinder is transmitted to the axial member; and
the electric booster comprises a transmission member operable to transmit a reactive force by a fluid pressure in the secondary pressure chamber of the tandem master cylinder to the axial member when a fluid pressure is not generated in the primary pressure chamber by a movement of the axial member.

2. The electric booster according to claim 1, wherein the transmission member comprises an elastic member which is disposed between a base end side of the secondary piston and the cylindrical member, and against which a tip of the axial member can abut.

3. The electric booster according to claim 2, wherein the elastic member is disposed on the base end side of the secondary piston, and the electric booster is configured so that the tip of the axial member abuts against the elastic member before a tip of the cylindrical member abuts against the base end side of the secondary piston.

4. The electric booster according to claim 3, wherein the cylindrical member can also abut against the elastic member.

5. The electric booster according to claim 3, wherein relative displacement positions of the axial member and the cylindrical member are controlled according to an input stroke.

6. The electric booster according to claim 2, wherein the elastic member transmits the reactive force of the secondary piston to the cylindrical member only when the tip of the axial member abuts against the base end side of the secondary piston.

7. The electric booster according to claim 6, wherein relative displacement positions of the axial member and the cylindrical member are controlled according to an input stroke.

8. The electric booster according to claim 2, wherein relative displacement positions of the axial member and the cylindrical member are controlled according to an input stroke.

9. The electric booster according to claim 1, wherein the transmission member comprises a rod member, the rod member being disposed through a slide hole formed through the secondary piston of the tandem master cylinder in the axial direction thereof, the rod member being operable to transmit the reactive force by the fluid pressure in the secondary pressure chamber to the axial member by receiving the fluid pressure in the secondary pressure chamber.

10. The electric booster according to claim 9, wherein the rod member is able to abut against the axial member, and has a surface receiving the fluid pressure in the primary pressure chamber on an opposite side from a side receiving the fluid pressure in the secondary pressure chamber, and an area of a surface of the rod member receiving the fluid pressure in the secondary pressure chamber is equal to an area of a surface of the axial member receiving the fluid pressure in the primary pressure chamber.

11. The electric booster according to claim 10, wherein relative displacement positions of the axial member and the cylindrical member are controlled according to an input stroke.

12. The electric booster according to claim 9, wherein the rod member is constantly urged away from the axial member by an urging unit.

13. The electric booster according to claim 9, wherein the rod member is integrally formed with the axial member, and an area of a surface of the axial member receiving the fluid pressure in the primary pressure chamber is equal to an area of a surface of the rod member receiving the fluid pressure in the secondary pressure chamber.

14. The electric booster according to claim 13, wherein relative displacement positions of the axial member and the cylindrical member are controlled according to an input stroke.

15. The electric booster according to claim 9, wherein relative displacement positions of the axial member and the cylindrical member are controlled according to an input stroke.

16. The electric booster according to claim 1, wherein relative displacement positions of the axial member and the cylindrical member are controlled according to an input stroke.

17. An electric booster, comprising:
an axial member movable forward and backward in response to an operation of a brake pedal;
a cylindrical member disposed around the axial member so as to be movable relative to the axial member; and
an electric actuator operable to cause a forward/backward movement of the cylindrical member,
wherein the axial member and the cylindrical member face a primary pressure chamber of a tandem master cylinder having a secondary piston which separates the primary pressure chamber and a secondary pressure chamber;
a reactive force of a brake fluid pressure generated in the tandem master cylinder is transmitted to the axial member; and
the electric booster is configured so that a tip of the axial member abuts against a base end side of the secondary piston when a fluid pressure is not generated in the primary pressure chamber by a movement of the axial member.

18. A tandem master cylinder, comprising:
a cylinder body;
a primary pressure chamber formed at a front end of an axial member movable forward and backward in response to an operation of a brake pedal, and at a front end of a cylindrical member disposed around the axial member so as to be movable relative to the axial member and adapted to move in the cylinder body by an actuator;
a secondary piston adapted to move in the cylinder body in front of the primary pressure chamber; and
a secondary pressure chamber defined by the secondary piston and the cylinder body,
wherein a brake fluid pressure is generated by an input thrust force provided from the brake pedal to the axial member, and a thrust force provided from the actuator to the cylindrical member; and
the tandem master cylinder comprises a transmission member operable to transmit a reactive force by a fluid pressure in the secondary pressure chamber to the axial member when a fluid pressure is not generated in the primary pressure chamber by a movement of the axial member.

19. The tandem master cylinder according to claim 18, wherein the transmission member comprises an elastic member which is disposed between a base end side of the secondary piston and the cylindrical member, and against which a tip of the axial member can abut.

20. The tandem master cylinder according to claim 18, wherein the transmission member comprises a rod member, the rod member being disposed through a slide hole formed through the secondary piston of the tandem master cylinder in the axial direction thereof, the rod member being operable to transmit the reactive force by the fluid pressure of the secondary pressure chamber to the axial member by receiving the fluid pressure in the secondary pressure chamber.

* * * * *